United States Patent
Doh

(10) Patent No.: US 11,361,022 B2
(45) Date of Patent: Jun. 14, 2022

(54) TERMINAL AND APPARATUS FOR PROVIDING SEARCH INFORMATION BASED ON COLOR INFORMATION

(71) Applicant: MYCELEBS CO., LTD., Seoul (KR)

(72) Inventor: Jun Woong Doh, Seoul (KR)

(73) Assignee: MYCELEBS CO., LTD., Seoul (KR)

( * ) Notice: Subject to any disclaimer, the term of this patent is extended or adjusted under 35 U.S.C. 154(b) by 0 days.

(21) Appl. No.: 16/749,814

(22) Filed: Jan. 22, 2020

(65) Prior Publication Data

US 2020/0285671 A1    Sep. 10, 2020

(51) Int. Cl.
| | | |
|---|---|---|
| G06F 16/78 | (2019.01) | |
| G06F 16/738 | (2019.01) | |
| G06F 16/735 | (2019.01) | |
| G06F 16/783 | (2019.01) | |

(52) U.S. Cl.
CPC ........ G06F 16/7867 (2019.01); G06F 16/735 (2019.01); G06F 16/738 (2019.01); G06F 16/785 (2019.01)

(58) Field of Classification Search
CPC .................................................. G06F 16/532
See application file for complete search history.

(56) References Cited

U.S. PATENT DOCUMENTS

| | | | | |
|---|---|---|---|---|
| 6,904,560 B1 * | 6/2005 | Panda | ...................... | G06F 16/58 715/202 |
| 10,109,051 B1 * | 10/2018 | Natesh | .................. | G06K 9/4652 |
| 2009/0012863 A1 * | 1/2009 | Saephan | ............ | G06Q 30/0269 705/14.54 |
| 2015/0378999 A1 * | 12/2015 | Dorner | .................. | G06F 16/235 707/745 |
| 2015/0379731 A1 * | 12/2015 | Dorner | ............... | G06Q 30/0276 382/164 |
| 2015/0379743 A1 * | 12/2015 | Dorner | ...................... | G06T 7/90 345/593 |
| 2015/0379959 A1 * | 12/2015 | Dorner | ................ | G06F 16/5838 345/589 |
| 2016/0005188 A1 * | 1/2016 | Dorner | ...................... | G06T 7/90 382/162 |

(Continued)

FOREIGN PATENT DOCUMENTS

| | | |
|---|---|---|
| JP | 2001160057 A | 6/2001 |
| KR | 1020090049433 A | 5/2009 |
| KR | 1020180051449 A | 5/2018 |

OTHER PUBLICATIONS

Rother, C. et al., "GrabCut—Interactive Foreground Extraction using Iterated Graph Cuts", SIGGRAPH, 2004, 6 pages.

(Continued)

*Primary Examiner* — William Spieler
(74) *Attorney, Agent, or Firm* — Nath, Goldberg & Meyer; Gregory B. Kang; Morgan D. Rosenberg

(57) ABSTRACT

The present disclosure relates to a terminal, an apparatus, and a method for providing search information based on color information, the method including, acquiring a search keyword; selecting one or more colors, correlated with the acquired keyword, based on a pre-stored keyword-color information correlation; searching for an object that matches with the selected color; and configuring an interface page information including information about the searched object.

11 Claims, 9 Drawing Sheets

(56) References Cited

U.S. PATENT DOCUMENTS

2016/0104303 A1* 4/2016 Dorner ................. G06K 9/4652
                                                              382/164
2016/0335784 A1* 11/2016 Dorner ................... H04N 1/644

OTHER PUBLICATIONS

Barghout, L. et al., "Real-world scene perception and perceptual organization: Lessons from Computer Vision," Journal of Vision 13.9, 2013, p. 709(abstract).
Mobahi, H. et al., "Segmentation of Natural Images by Texture and Boundary Compression", Research Paper, Nov. 4, 2018, pp. 1-20.
Mobahi, H. et al., "Segmentation of Natural Images by Texture and Boundary Compression", International Journal of Computer Vision (IJCV), Oct. 2011, 95(1):86-98.
Ohlander, R. et al., "Picture Segmentation Using A Recursive Region Splitting Method," Computer Graphics and Image Processing, 1978, 8(3):313-333.
Yan, Q. et al., "Hierarchical Saliency Detection," Proceedings of the 2013 IEEE Conference on Computer Vision and Pattern Recognition, Jun. 2013, pp. 1155-1162.

* cited by examiner

TERMINAL AND APPARATUS FOR PROVIDING SEARCH INFORMATION BASED ON COLOR INFORMATION

CROSS-REFERENCE TO RELATED APPLICATION

This application claims priority under 35 U.S.C. § 119 to Korean Patent Application No. 10-2019-0008581, filed on Jan. 23, 2019, in the Korean Intellectual Property Office (KIPO), the disclosure of which is incorporated by reference herein in its entirety.

TECHNICAL FIELD

Embodiments of the present disclosure relate to a terminal, an apparatus, and a method for providing search information based on color information, and more particularly, to a method and an apparatus that receive a keyword from a user and provide an information about an object matching with the keyword based on color information.

DISCUSSION OF RELATED ART

According to conventional search methods, a user may search for desired web documents or the like by entering a search keyword into a search box. For example, a user may retrieve information about the movie "Interstellar" by entering the title of the movie "Interstellar" into the search box. However, if a user cannot remember the title of a movie which he or she desires to search for, he or she needs to provide another type of information. For example, a user may attempt a search by entering an actor, director, producer, or the like of a movie which he or she desires to search for. There are many cases where movie information sites and movie review sites provide cast information as well as movie information, and thus the user may search for a desired movie by using an actor, a director, a producer, or the like as a keyword unless he or she is unlucky.

The conventional search methods, however, cannot be used if information to be used is information based on an atypical language, for example, an emotional expression, rather than typical information. For example, responses provided by conventional search engines for a search term, such as "atmospheric curtain" or "bright curtain," will be merely search results including documents which have been created including the keyword "atmospheric curtain" or "bright curtain." However, an atypical language requires an approach different from that for typical information. Although documents do not include the keyword "atmospheric" or "bright," there could be a lot of curtains for which many people might feel "atmospheric" or "bright." Furthermore, for other fields other than daily supplies, e.g., artworks, a different approach may be required for requesting information by using an atypical language.

Meanwhile, this year's color, which reflects the spirit of the times, is creating a new color trend, while influencing not only fashion but also interior, cosmetics, printing, publishing, film, digital and consumer goods industries. In addition to color standards and consulting, hundreds of Pantone brand licenses are sold in more than 100 countries and are widely deployed in industrial design and consumer markets, including graphic arts, fashion, home, interior, plastic, architecture and paint.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present disclosure may be directed to a method and an apparatus for receiving a keyword from a user and providing information about a product that matches with the keyword of the user through the use of color information that matches with the keyword.

According to an embodiment of the present disclosure, a method for providing search information based on color information, performed by an information providing apparatus, includes: acquiring a search keyword; selecting one or more colors, correlated with the acquired keyword, based on a pre-stored keyword-color information correlation; searching for an object that matches with the selected color; and configuring an interface page information including information about the searched object.

In some embodiments, the method may further include: collecting an image of the searched object and documents created in correlation with the image; selecting a representative color information by extracting a color information included in the image; extracting a keyword from the documents and calculating a correlation between the representative color information and the keyword based on frequency of the keyword; and storing the calculated color information-keyword correlation.

In some embodiments, the method may further include: receiving a detailed view through the interface page information including the information about the searched object, and providing additional information of a search result.

In some embodiments, when the object is an artwork, the additional information may include any one or more of an artist, theme, year of production, type of work, size of work, and location, and when the object is a product, the additional information may include any one or more of detailed information and vendor of the product.

In some embodiments, the keyword may be an emotional expression.

According to an embodiment of the present disclosure, an apparatus for providing search information based on color information includes: a storage unit storing a keyword-color correlation; a communication unit configured to transmit data to and receive data from a terminal, the data being for the search information based on color information, a controller configured to acquire a keyword, to be searched, from the communication unit, select one or more colors correlated with the acquired keyword, search for an object that matches with the selected color, create an interface page information including information about the searched object, and provide the terminal with the interface page information.

In some embodiments, the controller may collect documents created in correlation with an image of the object to be searched, extract an emotional expression included in the documents by using a pre-stored emotional expression dictionary, extract color information included in the image to select a representative color information, and calculates a keyword-color correlation based on frequency of the emotional expression.

In some embodiments, in a case where a category of the object to be searched is limited, the controller may filter only a result about the corresponding category, from among a search result, to extract documents that meet a filtering condition.

In some embodiments, the controller may select a representative color about a region of interest of the image.

In some embodiments, the controller may identify a color code mapped to an average pixel value of each unit block constituting the image, and select a representative color based on a count value of the color code for all unit blocks constituting the image.

In some embodiments, when the controller is requested to search for a keyword for an arbitrary color, the controller may provide an interface page information including a correlated keyword based on the keyword-color correlation.

According to an embodiment of the present disclosure, a method for providing search information based on color information, performed by an information providing terminal, includes: displaying a keyword selection interface page information; acquiring a selected search keyword through the keyword selection interface page information; transmitting the selected search keyword to an information providing apparatus; displaying an interface page information including one or more color information selected based on a pre-stored keyword-color information correlation; and displaying an interface page information including information about a searched object that matches with the color information correlated with the search keyword.

In some embodiments, the method may further include: displaying a color setting interface page that allows a user to select an arbitrary color information from among a plurality of color information displayed based on a pre-stored keyword-color information correlation; and matching one or more color information selected through the color setting interface page with a selected keyword and storing it.

In some embodiments, receiving selection of the keyword through the keyword selection interface page may include checking whether a color information that matches with the selected keyword is pre-stored; and displaying, when the pre-stored color information is present, an interface page information that includes information about the searched object that matches with the pre-stored color information.

According to an embodiment of the present disclosure, a terminal for providing search information based on color information includes: a communication unit configured to transmit data to and receive data from the terminal, the data being for the search information based on color information, a display unit configured to display an interface page information received from an information providing apparatus; and a controller configured to control the communication unit and the display unit, so that a search keyword selected through an interface page is transmitted to the information providing apparatus, and an interface page information including one or more color information selected based on a pre-stored keyword-color information correlation and an interface page information including information about a searched object that matches with the color information correlated with the search keyword are displayed.

In some embodiments, the controller may display a color setting interface page that allows a user to select an arbitrary color information from among a plurality of color information displayed based on a pre-stored keyword-color information correlation, and match one or more color information set through the color setting interface page with the selected keyword to store it.

In some embodiments, when a search keyword is selected through the interface page, the controller may identify whether a color information that matches with the selected keyword is pre-stored, and display, when the pre-stored color information is present, an interface page information that includes information about the searched object that matches with the pre-stored color information.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Figure 1:
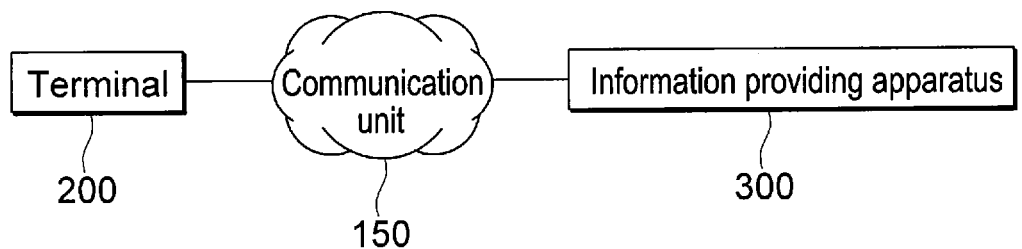
FIG. 1 is a view illustrating a search information providing system based on color information according to an embodiment.

Embodiments will now be described more fully hereinafter with reference to the accompanying drawings.

Although the invention may be modified in various manners and have several embodiments, embodiments are illustrated in the accompanying drawings and will be mainly described in the specification. In describing embodiments, descriptions of technical contents that are well known in the pertinent art to which this disclosure belongs and are not directly related to the disclosure will be omitted. This is to more clearly communicate the subject matter of the present disclosure by omitting unnecessary description. However, the scope of the present disclosure is not limited to the embodiments and should be construed as including all the changes, equivalents and substitutions included in the spirit and scope of the present disclosure.

In the drawings, certain elements or shapes may be simplified or exaggerated to better illustrate the present invention, and other elements present in an actual product may also be omitted. Like reference numerals refer to like elements throughout the specification. Thus, the drawings are intended to facilitate the understanding of the present invention. In addition, like reference numerals refer to like elements throughout the specification.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

FIG. 1 is a view illustrating a search information providing system based on color information according to an embodiment.

Referring to FIG. 1, an information providing system according to an embodiment may include a terminal 200, an information providing apparatus 300, and a communication network 150.

The terminal 200 may be implemented as, e.g., a smartphone, a PDA, a tablet PC, a notebook computer, a laptop computer, a personal computer, another electronic apparatus capable of performing communication, receiving input from a user, and outputting screens, or a similar apparatus.

The information providing apparatus 300 may be implemented as, e.g., a workstation, a server, a general-purpose computer, another electronic apparatus capable of performing communication, or a similar apparatus.

The terminal 200 and the information providing apparatus 300 are connected to and communicate with each other over the communication network 150.

The communication network 150 may be implemented using at least part of Long Term Evolution (LTE), LTE-Advanced (LTE-A), WI-FI, Local Area Network (LAN), Wide Area Network (WAN), Code Division Multiple Access (CDMA), Time Division Multiple Access (TDMA), Wireless Broadband (WiBro), and Global System for Mobile Communications (GSM), and other communication methods developed in the past, being currently developed, and to be developed in the future. Hereinbelow, for the sake of convenience, the terminal 200 and the information providing apparatus 300 will be described as directly communicating with each other without references to the communication network 150.

The detailed steps and configurations of the terminal 200 and the information providing apparatus 300 will be described below.

Figure 2:
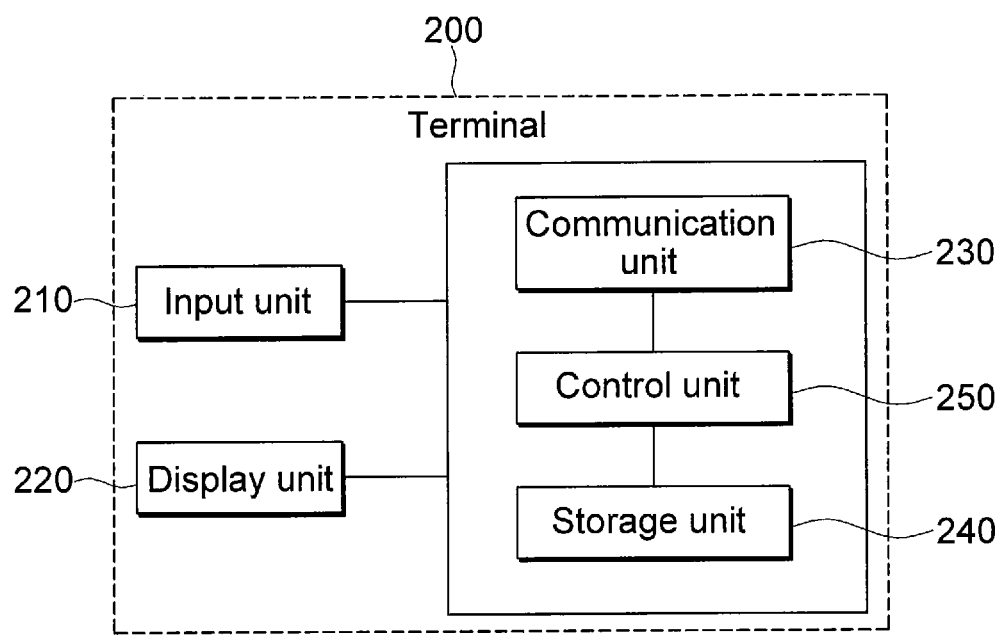
FIG. 2 is a block diagram illustrating a terminal according to an embodiment of the present disclosure.

FIG. 2 is a block diagram illustrating a terminal 200 according to an embodiment of the present disclosure.

Referring to FIG. 2, the terminal 200 according to an embodiment may include an input unit 210, a display unit 220, a communication unit 230, a storage unit 240, and a controller 250.

The input unit 210 converts an input operation of a user into an input signal and transmits the input signal to the controller 250. The input unit 210 may be implemented as, e.g., a keyboard, a mouse, a touch sensor on a touch screen, a touchpad, a keypad, a voice input apparatus, or another input processing apparatus developed in the past, being currently developed, or to be developed in the future. For example, the input unit 210 may receive an information provision request input from a user and may transmit the information provision request input to the controller 250.

The display unit 220 outputs a screen under the control of the controller 250. The display unit 220 may be implemented as, e.g., a liquid crystal display (LCD) apparatus, a light-emitting diode (LED) apparatus, an organic LED (OLED) apparatus, a projector, or another display apparatus developed in the past, being currently developed, or to be developed in the future. For example, the display unit 220 may display an interface page or information provision result page for the providing of information. In an embodiment, a component using another method capable of transmitting information to a user, such as voice output or vibration, rather than screen output, may be used in place of the display unit 220.

The communication unit 230 exchanges data with the information providing apparatus 300 and/or other external apparatuses. The communication unit 230 transmits data, received from the information providing apparatus 300, to the controller 250. Furthermore, the communication unit 230 transmits data to the information providing apparatus 300 under the control of the controller 250. The communication technology used by the communication unit 230 may vary depending on the type of communication network 150 or other circumstances.

The storage unit 240 stores data under the control of the controller 250, and transmits requested data to the controller 250.

The controller 250 controls an overall operation of the terminal 200 and individual components. In particular, the controller 250 transmits an information provision request or another type of data to the information providing apparatus 300 according to information input from the input unit 210 and displays a result page and/or an interface page through the display unit 220 according to page information received from the information providing apparatus 300.

The step performed by the controller 250 may be distributed and processed by a plurality of arithmetic and logic units which are physically distributed. There may be a method in which part of the operation performed by the controller 250 is performed by a first server and the remaining operation is performed by a second server. In such a case, the controller 250 may be implemented as the sum of arithmetic and logic units which are physically separated from each other.

The storage unit 240 may be implemented as the sum of storage apparatuses which are physically separated from each other.

When the controller 250 or storage unit 240 is implemented as the sum of a plurality of apparatuses which are physically separated from each other, communication is required between the plurality of apparatuses. In such a case, for the sake of simplicity of description, the following description will be given on the assumption that the storage unit 240 or controller 250 is implemented as a single object.

In a case where the terminal 200 transmits or receives data, the communication unit 230 may be described as transmitting or receiving data under the control of the controller 250, or the controller 250 may be described as transmitting or receiving data by controlling the communication unit 230, depending on the point of view of a corresponding situation.

Figure 3:
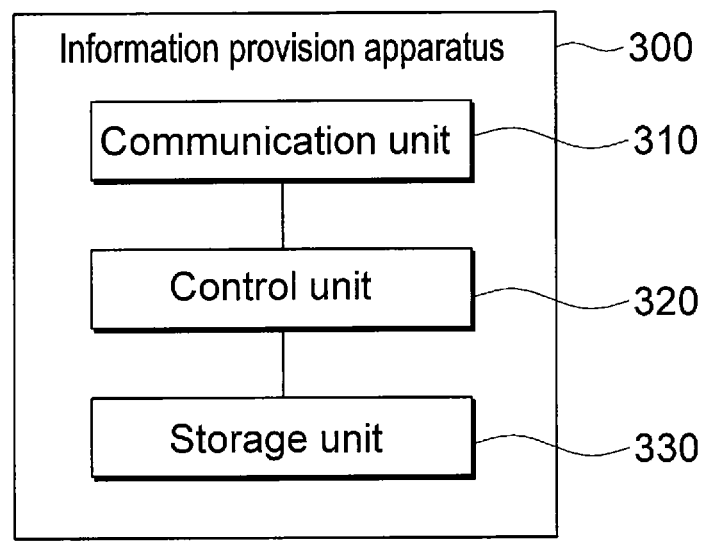
FIG. 3 is a block diagram illustrating an information providing apparatus according to an embodiment of the present disclosure.

FIG. 3 is a block diagram illustrating an information providing apparatus 300 according to an embodiment of the present disclosure.

Referring to FIG. 3, the information providing apparatus 300 according to an embodiment may include a communication unit 310, a controller 320, and a storage unit 330.

The communication unit 310 exchanges data with the terminal 200 and/or other external apparatuses. The communication unit 310 transmits data, received from the terminal 200, to the controller 320. Furthermore, the communication unit 310 transmits data to the terminal 200 under the control of the controller 320. The communication technology used by the communication unit 310 may vary depending on the type of communication network 150 or other circumstances.

The storage unit 330 stores data under the control of the controller 320, and transmits data, requested by the controller 320, to the controller 320.

The controller 320 controls an overall operation of the information providing apparatus 300 and individual components. In particular, when the controller 320 receives an interface page request, an information provision result page request, or another type of data through the communication unit 310, the controller 320 loads (retrieves) required data from the storage unit 330, generates a page information, and transmits the page information to the terminal 200 through the communication unit 310.

In a case where the information providing apparatus 300 transmits or receives data, the communication unit 310 may be described as transmitting or receiving data under the control of the controller 320, or the controller 320 may be described as transmitting or receiving data by controlling the communication unit 310, depending on the point of view of a corresponding situation.

Meanwhile, the storage unit 330 stores a program code for performing a method for providing search information based on color information, and/or an installation package (installation program code) for installing the program. Hereinafter, the program code for performing the method for providing search information based on color information and/or the installation package (installation program code) for installing the program are referred to as a virtual input interface program.

A developer or manager who develops the information providing apparatus 300 may store the virtual input interface program in the storage unit 330. When the information providing apparatus 300 receives a request message for requesting the virtual input interface program through the communication unit 310, the controller 320 transmits the virtual input interface program to the terminal 200 through the communication unit 310.

The detailed operations of the individual components of the information providing apparatus 300 will be described below.

According to another embodiment, data adapted to provide information by using a voice form or another method may be transmitted and received in place of a page adapted to visually provide information.

Figure 4:
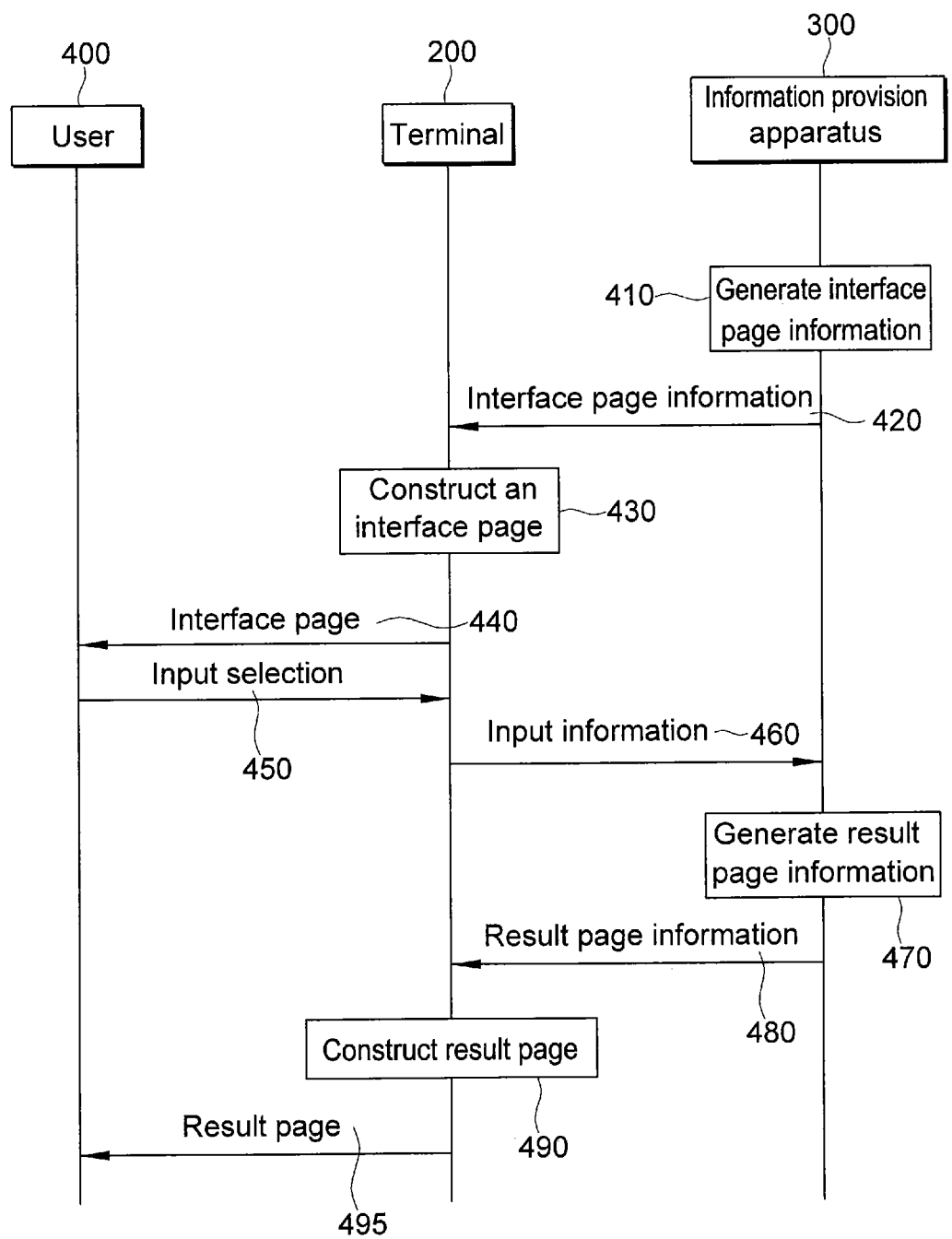
FIG. 4 is a flowchart illustrating a process of providing information through an information providing interface according to an embodiment of the present disclosure.

FIG. 4 is a flowchart illustrating a process of providing information through an information providing interface according to an embodiment of the present disclosure.

At step 410, the controller 320 of the information providing apparatus 300 generates an interface page information. The interface page information is an information required to generate an information interface page. The interface page is a page adapted to prompt the input of a user, to receive the input of the user, and to transmit the input of the user to the information providing apparatus 300. For example, the interface page information may be in the form of an HTML documents or another markup language documents. In another embodiment, the terminal 200 may have the form information of the interface page in advance, and only an item corresponding to content may be transmitted from the information providing apparatus 300 to the terminal 200. Hereinbelow, for the sake of convenience, the following description will be given on the assumption that the interface page information or another type of page information is transmitted in the form of an HTML documents. However, the scope of the present disclosure is not limited thereto.

At step 420, the communication unit 310 of the information providing apparatus 300 transmits the interface page information to the terminal 200.

At step 430, the controller 250 of the terminal 200 configure an interface page by using the interface page information. For example, the controller 250 may run a web browser, may interpret an HTML documents, and may configure an interface page in the form of a web page. A separate application may be used in place of the web browser.

At step 440, the display unit 220 of the terminal 200 displays the interface page to a user 400. The interface page may include an interface in which, e.g., the user 400 may request the providing of information, may input and/or select a keyword for the providing of the information, and may make other settings for the providing of the information.

At step 450, the input unit 210 of the terminal 200 receives the selection input of the user 400 through the input interface page and transmits the selection input to the controller 250.

At step 460, the communication unit 230 of the terminal 200 transmits an input information adapted to identify the selection input of the user 400 to the information providing apparatus 300 under the control of the controller 250.

At step 470, the controller 320 of the information providing apparatus 300 generates a result page information by using the input (e.g., a keyword and/or another information providing setting) of the user 400. A preparation process of generating the result page information and a process of generating the result page information will be described with reference to FIGS. 5 to 8 later. The result page information may be configured, e.g., in the form of an HTML documents and/or in the form of an image.

At step 480, the communication unit 310 of the information providing apparatus 300 transmits the result page information to the terminal 200.

At step 490, the controller 250 of the terminal 200 configures a result page by using the result page information received by the communication unit 230. For example, the controller 250 may construct a result page by interpreting the result page information in an HTML form.

At step 495, the display unit 220 of the terminal 200 provides the result page to the user 400.

Although it is assumed that a page in a visual form is provided to the user 400 in the embodiment of FIG. 4, the interface or result information may be provided by voice. In such a case, a voice output unit may be used in place of the display unit 220. Another type of interface method available currently or in the future may be used in conjunction with the user 400 in place of the visual/aural method. In such a case, the information providing apparatus 300 may provide information, obtained through conversion using another method, to the terminal 200 in place of the page information in accordance with the interface method.

Figure 5:
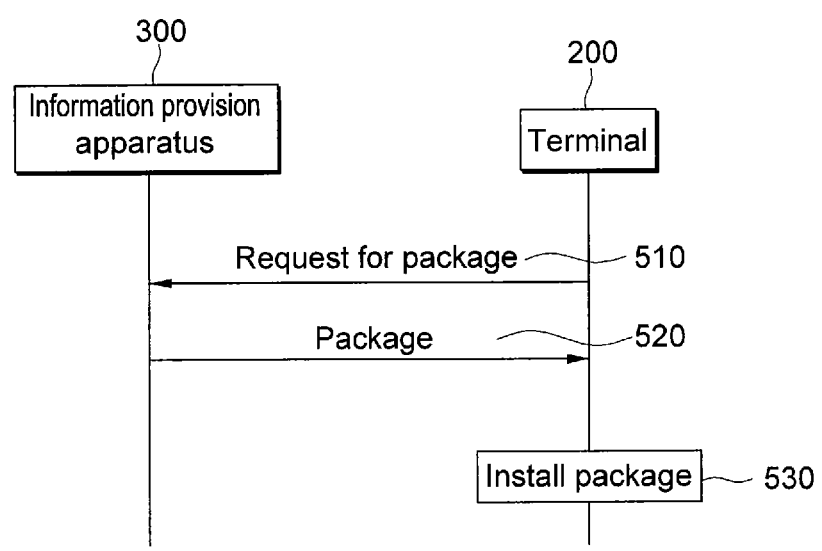
FIG. 5 is a flowchart illustrating a process of installing a virtual input interface program according to an embodiment of the present disclosure.

FIG. 5 is a flowchart illustrating a process of installing a virtual input interface program according to an embodiment of the present disclosure.

At step 510, the terminal 200 transmits a package request message to a server (hereinafter, a program providing server) 500 that provides a force (e.g., force touch or pressure) input interface program. The package request message is a message for requesting a virtual input interface program. At step 520, the program providing server 500 delivers the virtual input interface program (package) to the terminal 200.

At step 530, the terminal 200 installs the received virtual input interface program (package). In a case the received virtual input interface program may be executed as it is, without the need for installation, the step 530 may be omitted. The terminal 200 executes the virtual input interface program according to a user's input and performs a method for providing search information based on color information.

Figure 6:
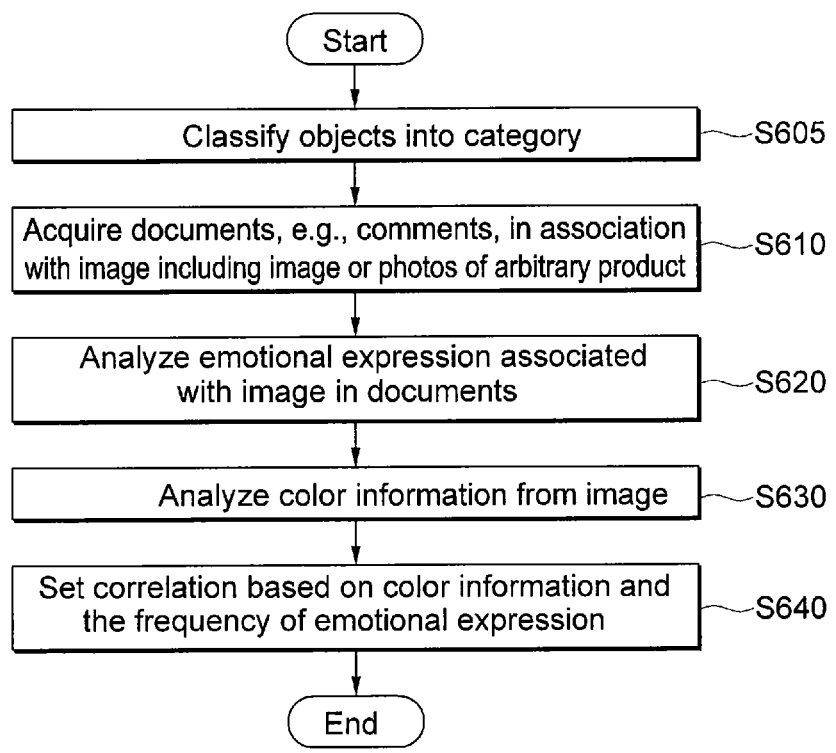
FIG. 6 is a flowchart illustrating a method of setting a correlation between a keyword and color information according to an embodiment of the present disclosure.

FIG. 6 is a flowchart illustrating a method of setting a correlation between a keyword and color information according to an embodiment of the present disclosure.

An information provision method of a system for providing search information based on color information according to an embodiment of the present disclosure is a method for providing information about an object to be searched, that matches with a keyword selected by a user, based on color information. That is, if a keyword selected by the user is 'elegant', it is a method of recommending an object to be searched that has a high color correlation with the keyword 'elegant'.

The keyword may be a word, phrase or sentence and includes an emotional expression representing user's taste, preferences, priorities and feelings.

Referring to FIGS. 2, 3, and 6, at step 605, the information providing apparatus 300 may classify images of the objects into a plurality of categories. With the category, objects, e.g., artworks, products, contents, places, and foods, having strong user's preference according to colors may be classified according to the purpose. Products may include fashion goods including clothes, bags, purses and fashion items, and beauty goods including cosmetics and hair. Contents may include movies, broadcasts, and arts. Places may include lodging, activities, attractions, cities, and the like. Food may include food and restaurants.

Through classification into categories, the user may filter out only images of objects that belong to the category desired by the user. To this end, the information providing apparatus 300 guides the user to select a filtering condition and extracts only documents that are created for images that meet the filtering condition selected by the user. Herein, the filtering condition may include the aforementioned category. That is, the information providing apparatus 300 may extract and analyze only documents that belong to the category selected by the user out of acquired documents. For example, when an artwork is selected by the user, only documents related to artworks may be extracted, and the following steps may be performed on the extracted documents. The extracted documents may all be evaluated as having an equivalent value, or the latest documents may be evaluated as having a higher value.

In addition, when a plurality of keywords appear in one document, a representative keyword may be selected based on the frequency of appearance for the plurality of keywords. Alternatively, a plurality of keyword pairs may be selected. Depending on the frequency of appearance of the keywords, a weight factor may be differently imparted when calculating correlations. The higher the frequency of the keyword, the higher the degree of correlation or the greater the weight factor. In other words, the correlation between the frequency of the keyword and the image of the documents has a positive correlation.

At step 610, the information providing apparatus 300 collects documents created in association with the image. The documents contain comments or posts associated with the corresponding image. For example, in a case where there is a text together with the image in the same document, the keyword, phrase, etc. of the text may be regarded as being related to the image. In another example, when a distance between an image and a keyword (or a phrase, etc.) is equal to or less than a preset value, the keyword may be regarded as being related to the image. The distance between the image and the keyword may be calculated using one or more of the number of images present between the image and the keyword, the number of bytes of the text, the number of characters, the number of words, the number of word segments, the number of lines, and the number of sentences. For example, when the distance between the image and the keyword is calculated using the number of word segments, the distance between the image and the keyword may be a value proportional to the number of word segments between the image and the keyword.

For example, the information providing apparatus 300 may acquire texts that the user posted on a social network service (SNS) such as a web page, a blog, various cafe communities, a community site, Twitter, or Facebook or text or comments that are written in relation to the image in a shopping mall, YouTube, a portal site, or Twitter.

At step 620, the information providing apparatus 300 analyzes the keyword that appear together with each image in the same documents. To this end, the storage unit 330 or an external server may have an emotional expression dictionary. The emotional expression dictionary is a tool for determining whether a word (keyword) is an emotional expression, and may have, for example, a list of emotional expressions. Keywords included in the list of emotional expressions may be determined to be emotional expressions, and keywords not included in the list of emotional expressions may be determined that they are not emotional expressions. However, since such determination is based on the lexical meaning and may not reflect the word usage of the public, the emotional expressions may be added or deleted by the administrator.

At step 630, color information of each image is analyzed.

First, a region of interest is extracted from an image. As used herein, the region of interest means a region where an object of the category is present in the image, except for a background. However, in the case of landscape photographs or photographs where backgrounds are also important, an entire region may be a region of interest. Thus, the region of interest may be a partial region in the image or may be the entire region. The region of interest may be manually set in some cases or may be extracted based on image segmentation or saliency values.

Image segmentation may be performed to segment the image into a plurality of regions, and a part of the segmented regions may be extracted as the region of interest.

Image segmentation is a technique of segmenting an image into a plurality of segments—a set of pixels—and is a technique widely used for detecting a location of an object or an object boundary. As used herein, the image segmentation is a technique of projecting or segmenting each pixel, having different signal values, included in an image, into predetermined categories according to a predetermined criterion. For example, one segment may be created by classifying pixels having similar signal values, adjacent to each other, or pixels corresponding to the same object into one category. In such a manner, a plurality of segments may be created in an image.

As an example, the information providing apparatus 300 may perform a segmentation method proposed by Carsten Rother in "GrabCut: interactive foreground extraction using iterated graph cuts, SIGGRAPH 2004" for image segmentation.

In addition, the information providing apparatus 300 may segment the background image into a plurality of regions by using various conventional image segmentation methods. For example, a clustering method, for example, proposed by Barghout, Lauren, and Jacob Sheynin in "Real-world scene perception and perceptual organization: Lessons from Computer Vision, Journal of Vision 13.9 (2013) 709-709", may be used. In addition, a compression-based method, for example, proposed by Hossein Mobahi, Shankar Rao, Allen Yang, Shankar Sastry and Yi Ma. in "Segmentation of Natural Images by Texture and Boundary Compression, International Journal of Computer Vision (IJCV), 95 (1), pg. 86-98, October 2011", may be used. In addition, a histogram-based method, for example, proposed by Ohlander, Ron; Price, Keith; Reddy, D. Raj in "Picture Segmentation Using a Recursive Region Splitting Method, Computer Graphics and Image Processing 8: 1978, 313-333" may be used. In addition, various image segmentation methods such as an edge-based method, a region growing method, a graph partitioning method, or a multi-scale method may be used to segment images. In the present disclosure, the method that may be used as the image segmentation technique is not limited to the above-described methods, and it is to be understood that other segmentation techniques may be used.

The information providing apparatus 300 may select a partial region from the plurality of segmented regions and may extract the partial region as the region of interest based on the saliency calculated for the image. In other words, the information providing apparatus 300 may calculate a saliency (e.g., importance value) of the image and may select a region of interest from among the segmented regions in the background image based on the saliency of each pixel according to the calculated saliency.

Alternatively, a pixel may be selected based on the saliency calculated for the background image, and an area including the selected pixel may be extracted as the region of interest.

In the field of image processing, saliency refers to a value that is expressed by quantifying what a human feels important when viewing an image. In other words, there is a factor that the human eye feels more important depending on the color, brightness, and contour of an object in the image, and the saliency is a numerical value of the degree of the factor. For example, the saliency may be set according to the degree of severe difference in color or brightness, and the degree of strong feature of the contour. For example, in "Yan, Q., Xu, L., Shi, J., & Jia, J. (2013, June). Hierarchical saliency detection. In Computer Vision and Pattern Recognition (CVPR), 2013 IEEE Conference on (pp. 1155-1162). IEEE.", a configuration where an image is segmented by layer (from a coarse level where an image is simplified to a fine level where the details remain), a local contrast for each layer is calculated to determine the saliency depending on the degree of difference, and the saliencies calculated for respective layers are combined to calculate the final saliency is disclosed. In the present disclosure, the saliency may be calculated using various conventional methods, as described above, and the region of interest may be selected from among the segmented regions.

Herein, the information providing apparatus 300 may select a region of great saliency, from among the segmented regions, as the region of interest. For example, the information providing apparatus 300 may set a threshold and may select an area having a saliency greater than the threshold as the region of interest. In addition, pixels of high saliency may be selected from among the pixels included in the image, and a region including the pixels may be selected as the region of interest.

In addition, the information providing apparatus 300 may extract the region of interest using various conventional methods for extracting regions of interest from an image, and the method of extracting a region of interest is not limited to the above described methods and may employ other techniques for extracting a region of interest.

Colors have their own color codes according to their chroma, brightness, and saturation. That is, a color code is assigned to each color. Accordingly, a color code mapped to an average pixel value of each unit block constituting the region of interest of the set image is identified, and the color codes of all unit blocks constituting an image are counted for each color code, based on the color code of each unit block.

Distribution of colors constituting the image is determined based on the color code corresponding to the average pixel value of all unit blocks constituting the image. A representative color of the image is selected based on the color distribution.

As for the representative color, a representative color code may be determined in consideration of the frequency based on the count number for each color code.

Preferably, a pair of a color code with the highest frequency and a color code with the second highest frequency, based on the count number for each color code of all unit blocks, may be determined as a representative color of the image.

The emotional expression analyzed at step 620 and the color information analyzed at step 630 are matched with each other at step 640 to establish a correlation between the color information and the emotional expression. There is a positive correlation between the frequency of the emotional expression and the emotional expression-color information correlation (color information-emotional expression correlation) for the corresponding image.

The emotional expression-color information correlation set in such a manner is stored in the storage unit 330.

Figure 7:
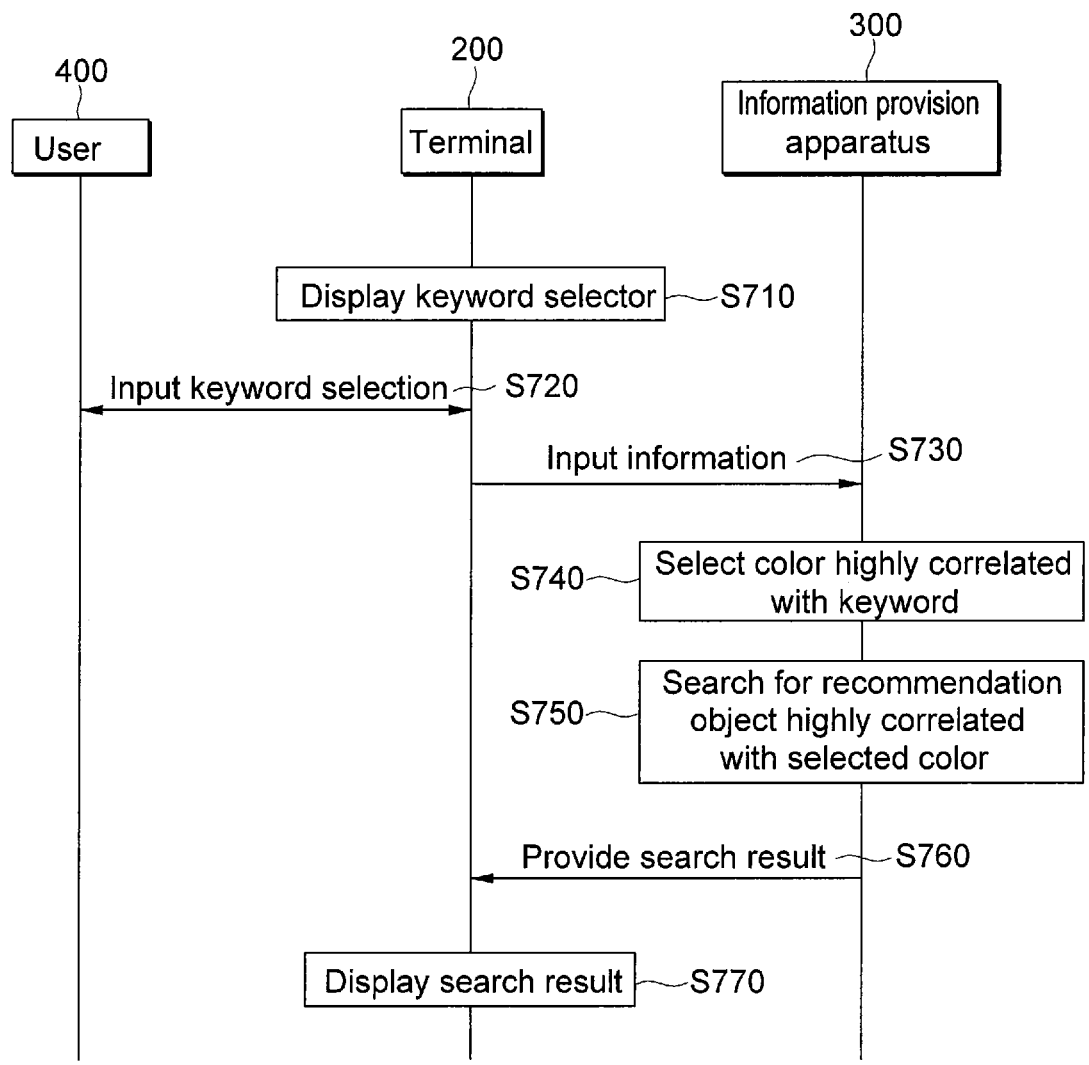
FIG. 7 is a flowchart illustrating a method for providing search information based on color information according to an embodiment of the present disclosure.

FIG. 7 is a flowchart illustrating a method for providing search information based on color information according to an embodiment of the present disclosure.

A method for providing search information based on color information will be described with reference to FIG. 7.

Hereinafter, information transfer through an interface among the terminal 200, the information providing apparatus 300, and the user 400 follows the method described above with reference to FIG. 4.

In addition, when the controller 250 of the terminal 200 controls the display unit 220 to output contents, controls the communication unit 230 to communicate with the information providing apparatus 300, controls the input unit 210 to receive an input of contents, or controls the storage unit 240 to store, it will be described that terminal 200 operates. The display unit 220 of the terminal 200 may be integrally (or unitarily) combined with the input unit 210 to serve as both the input unit 210 and the display unit 220. Hereinafter, the description will be given on the assumption that the display unit 220 may also serve as the input unit 210.

The terminal 200 receives an interface information that allows the user to select any one of a plurality of keywords provided from the information providing apparatus 300, and displays a keyword selector (S710). The keywords may include emotional expressions such as 'fresh', 'simple', 'refreshing', 'soft', and 'modest'.

The terminal 200 acquires a keyword selected by the user 400 and transmits the keyword to the information providing apparatus 300 (S720 and S730).

The information providing apparatus 300 selects a color that has a high degree of correlation (weight) with the keyword selected by the user based on the keyword-color correlation described with reference to FIG. 6 (S740). According to another embodiment, colors having a high correlation (weight) may be preselected, an interface allowing the user to select a color from the preselected colors may be provided, and part of the colors selected by the user may be utilized at step 740.

An object having a high correlation with the color selected at step 740 is searched for (S750). For example, a representative color of an image of an object of a database is selected, and a predetermined number of images that match with the selected color are extracted with reference to the representative color of each image. An information about the extracted object is transmitted to the terminal 200 as a recommendation result (S760). The information about the object may include an image of the object.

When detailed information about the recommendation result is requested from the terminal 200, additional information about the recommendation result is provided.

For example, when the search object is an artwork, the additional information may include any one or more of an artist, theme, production year, work type, work size, and location, and when the search object is a product, the additional information may include any one or more of detailed description of the product, vendor, etc.

Figure 8:
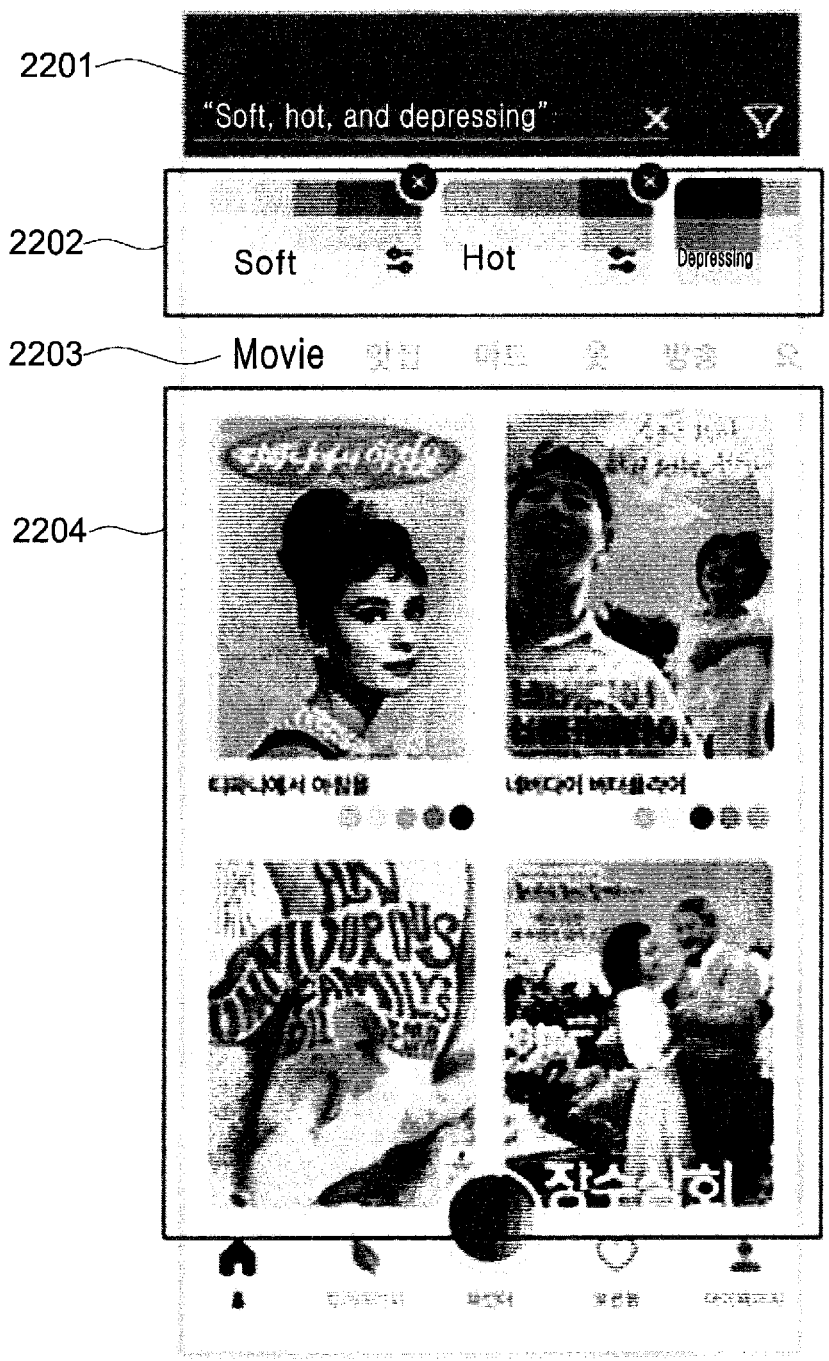
FIG. 8 is a view illustrating an interface page of a package that performs a method for providing search information based on color information according to an embodiment of the present disclosure.

FIG. 8 is a view illustrating an interface page of a package that performs a method for providing search information based on color information according to an embodiment of the present disclosure.

Referring to FIGS. 4, 7 and 8, an interface page of a virtual input interface program (package) for performing the method for providing search information based on color information according to an embodiment of the present disclosure may be an interface page which is configured in the terminal 200 when a package installed in the terminal 200 according to the package installation 530 is executed. Hereinafter, a virtual input interface program (package) is called an application.

Referring to FIG. 8, an interface page for performing a method for providing search information based on color information according to an embodiment of the present disclosure includes a key-talk display unit 2201, a color palette display unit 2202, a field display unit 2203, and a search information display unit 2204.

The display unit 220 of the terminal 200 displays an interface page. The interface page may be a whole page or a partial page of a program in which a package is installed and driven, or may be a page displayed by another web server connected to a program which is driven when a package installed in the terminal 200 is installed and executed.

According to some embodiments of the present disclosure, the term "key-talk" is used for a key of a talk, and may mean a string of characters that may be expressed or defined by correlation information with respect to keywords, or expressed or defined by its characteristics, usage, and properties. However, it is also possible to apply the present disclosure to a key-talk defined/expressed in other ways, for example by manual input by the administrator.

The key-talk display unit 2201 displays a keyword selected by the user. The keyword selected by the user may include a plurality of connected keywords such as "soft, hot and depressing".

The color palette display unit 2202 displays a set of one or more colors correlated with the keywords displayed on the key-talk display unit 2201. The set of one or more colors correlated with the keywords is called a color palette, for the sake of convenience. The one or more colors correlated with the keywords are selected based on the keyword-color information correlation described above with reference to FIG. 6. Any color palette displayed on the color palette display unit 2202 may include a menu which may be deleted by the user's choice. For example, each color palette is provided with an x-shaped button, and when the provided x-shaped button is selected, the corresponding palette is deleted. Alternatively, a palette editing menu may be provided so that a chosen color among a plurality of colors included in the color palette may be changed or deleted by double-clicking an arbitrary color palette displayed on the color palette display unit 2202.

When there are a plurality of keywords, a color palette including a plurality of colors may be displayed for each keyword.

The field display unit 2203 displays a field of an object to be searched. The field may be an item from which information is extracted based on the key-talk. The field may be, for example, an item such as a movie, restaurant, art, clothes, broadcast, or cuisine.

The search information display unit 2204 may display searched information.

When any one of a plurality of objects displayed on the search information display unit 2204 is selected, detailed information about the selected object may be displayed.

The detailed information may be displayed in the form of a pop-up window, or a separate interface page may be further provided.

Although not illustrated in FIG. 8, the interface page 2200 may include a text input unit and/or a voice input unit.

The text input unit receives text, in place of voice, about the key-talk from the user or receives part of key-talk that is set by the user as a favorite.

When an integrated voice input unit is selected, the terminal 200 installed with a package for performing the method for providing color-based search information according to an embodiment of the present disclosure performs an operation for receiving a voice input from the user. That is, the controller 250 of the terminal 200 operates the input unit 210 and displays, through the display unit 220, that a voice input function is turned on. For example, the terminal 200 may indicate that the voice input function is turned on by displaying, for example, "I am listening", for the user. The input unit 210 may include a voice input device such as a microphone. The input unit 210 of the terminal 200 receives an input word by voice from the user, and the input word may be a word, a phrase, or a sentence.

The terminal 200, installed with the package, recognizes the input voice and converts it into text. Recognizing the input voice and converting it into text may be performed by the controller 250 of the terminal 200 installed with the package, or the information providing apparatus 300 may receive data about the voice input to the terminal 200, recognize the voice, convert it into text, and transmit the converted text to the terminal 200.

The controller 250 of the terminal 200 installed with the package extracts a field-related word or a key-talk from the converted text. For example, if the user inputs, by voice, "recommend a soft and depressing movie", the controller 250 of the terminal 200 installed with the package extracts a key-talk "soft" and a key talk "depressing" and extracts "movie" corresponding to the field.

The terminal 200 installed with the package extracts information corresponding to each field based on the extracted key-talk. The extracted information may be object information corresponding to each field.

The terminal 200 may display object information, by each field, corresponding to each field on the search information display unit 2204.

For example, when the field is "art", an art image corresponding to the color information in the field of "art" provided by the information providing apparatus 300 is displayed on the search information display unit 2204, and when the field is "movie", an image and a title of the movie may be displayed on the search information display unit 2204. If the field is "product", an image and a name of the product may be displayed on the search information display unit 2204.

When any one of the displayed movies is selected, detailed information (additional information) of the corresponding movie may be additionally displayed.

The detailed information of art may include one or more of an artist, theme, production year, work type, work size, and location.

The detailed information of movie may include any one or more of a production year, director, storyline, cast list, commentary, and related articles.

The detailed information of product may include one or more of a detailed description, price, and vendor of the corresponding product.

Figure 9:
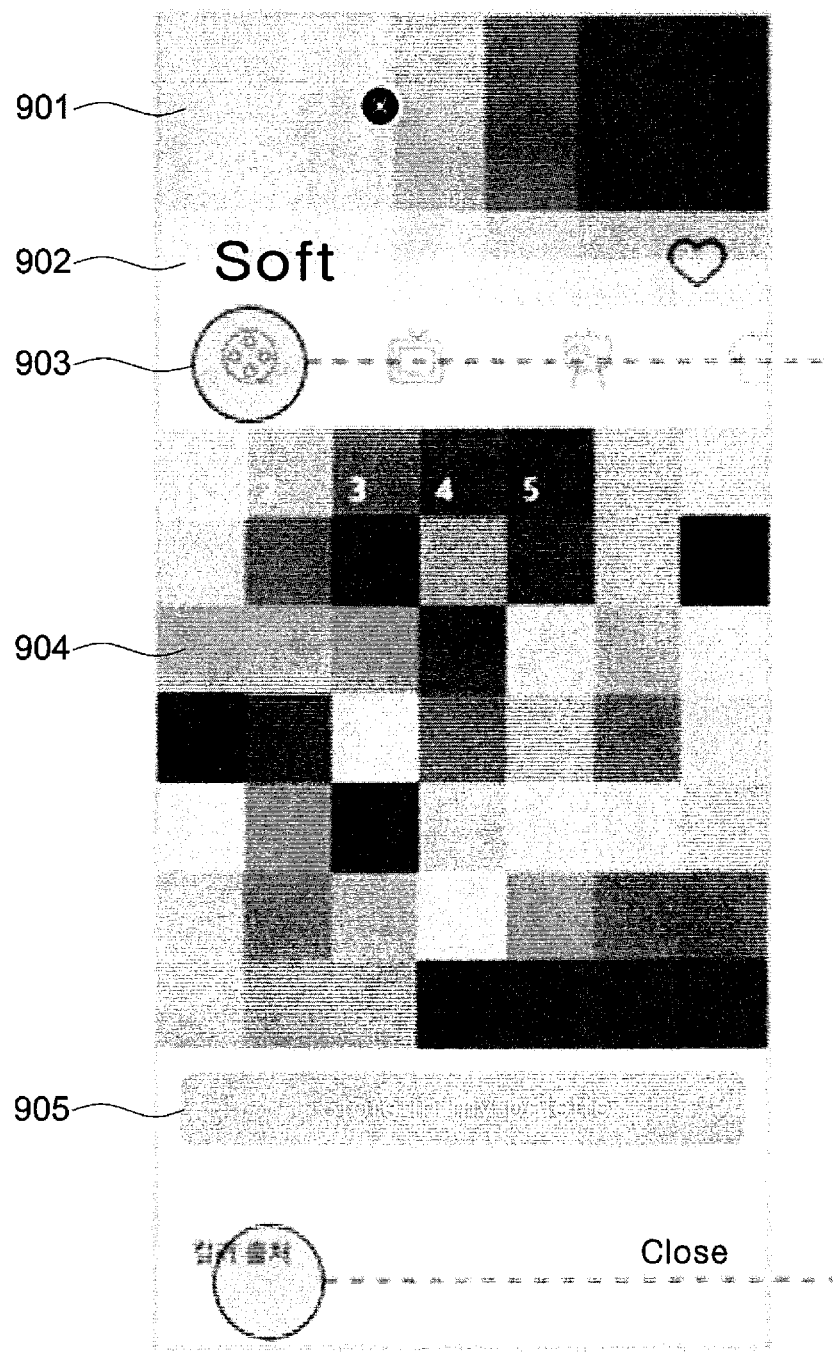
FIG. 9 is a view illustrating an interface page of a package that performs a method for providing search information based on color information according to an embodiment of the present disclosure.

FIG. 9 is a view illustrating part of an interface page of a virtual input interface program (package) for setting color information displayed when any keyword from among popular keywords in FIG. 8 is selected.

Referring to FIG. 9, an interface page for performing a method for providing search information based on color information according to an embodiment of the present disclosure may be an interface page of a package installed in the terminal of FIG. 5 according to the package installation 530.

An interface page 900 for setting color information according to an embodiment of the present disclosure may include a color palette display unit 901, a keyword display unit 902, a category display unit 903, a color setting unit 904, and a color palette information storage unit 905.

The terminal 200 installed with the package displays color information correlated with the selected keyword and extracts information, corresponding to each field, for a color palette, based on the extracted color information. The extracted information may be object information corresponding to each field.

The color palette display unit 901 displays color information correlated with the selected keyword.

The keyword display unit 902 displays a keyword correlated with the color palette display unit 901. As an example, the keyword display unit 902 may display 'soft'.

The category display unit 903 displays a category of objects to be searched.

The color setting unit 904 displays color information, in addition to the representative color displayed on the color palette, so that the colors displayed on the color palette display unit 901 may be finely adjusted according to the user's taste. The color displayed on the color setting unit 904 is displayed based on the keyword-color information correlation. The color displayed on the color setting unit 904 may be lower in terms of the keyword-color information correlation than that of colors displayed on the color palette display unit 901.

The color setting unit 904 may move the color, selected by the user from among the displayed colors, to the color palette.

The color palette information storage unit 905 stores, in the storage unit 330 of the terminal, the color information of the color palette unit, selected and edited by the color setting unit 904, in correlation with the keyword displayed on the keyword display unit 902.

As such, in a case where the color palette correlated with the keyword is stored in the storage unit 330 of the terminal, the color palette for the keyword stored in the storage unit 330 of the terminal takes precedence over the color palette provided from the information providing apparatus 300. That is, in a case where the color palette is stored, in correlation with the keyword, by the user, when the corresponding keyword is searched, the search is based on the color palette stored in the storage unit 330 of the terminal.

For example, in a case where the user sets a color palette for a keyword 'soft' as a 'color palette' with colors that have color codes "11111, 11112, 11113, 11114, 11115" and stores it in the storage unit 330 of the terminal, when a "soft" "movie" is searched later, the color information is not received from the information providing apparatus 300, and instead, movie images highly related with colors that have color codes "11111, 11112, 11113, 11114, 11115" in the color information of the color palette stored in the storage unit 330 of the terminal are filtered to retrieve the result.

In an embodiment, although not illustrated in FIGS. 8 and 9, the interface page may include a color selection button, in place of a keyword selection, and in such case, an interface page capable of searching for the selected color may be additionally provided. The user may select a desired color through the interface page capable of searching for colors and may receive a keyword highly related to the selected color based on the keyword-color information correlation.

In this case, it can be understood that individual blocks of the flowcharts and/or combinations of the blocks of the flowcharts may be performed by computer program instructions. Since it is possible to install these computer program instructions on a general-purpose computer, a special computer, or the processor of a programmable data processing device, the instructions executed through the computer or the processor of the programmable data processing device generate a means for performing functions which are described in the blocks of the flowcharts. Furthermore, since it is possible to store these computer program instructions in computer-usable or computer-readable memory that can be oriented to a computer or some other programmable data processing device in order to implement functions in a specific manner, it is possible to manufacture products in which instructions stored in computer-usable or computer-readable memory include means for performing functions described in the blocks of flowcharts. Moreover, since it is possible to install computer program instructions on a computer or another programmable data processing device, instructions for performing a series of operational steps on the computer or the programmable data processing device, generating processes executed by the computer and operating the computer or the programmable data processing device can provide steps for performing functions described in the blocks of flowcharts.

Furthermore, each block may refer to part of a module, a segment, or code including one or more executable instructions for performing one or more specific logical functions. Moreover, it should be noted that in some alternative embodiments, functions described in blocks may occur out of order. For example, two successive blocks may be actually performed at the same time, or sometimes may be performed in reverse order according to relevant functions.

In this case, the term "unit" used herein refers to a software or hardware component, such as an FPGA or ASIC, which performs a function. However, the term "~unit" is not limited to a software or hardware component. The "~unit" may be configured to be stored in an addressable storage medium or may be configure to run one or more processors. For example, the "~unit" may include components, such as software components, object-oriented software components, class components and task components, processes, functions, attributes, procedures, subroutines, segments of program codes, drivers, firmware, microcode, circuits, data, databases, data structures, tables, arrays, and variables. Functions provided by components and "~unit" may be combined into a smaller number of components and "~units", or may be divided into a larger number of components and "~units". Furthermore, components and "~units" may be each implemented to run one or more CPUs within a device or security multimedia card.

As set forth hereinabove, according to one or more embodiments of the present disclosure, when a user selects a keyword, a terminal, an apparatus, and a method for searching information based on color information may provide recommendation information about an object that matches with the keyword based on color information.

It will be understood by those having ordinary knowledge in the art to which the present disclosure pertains that the present disclosure may be practiced in other specific forms without changing the technical spirit or essential feature of the present disclosure. Therefore, the above-described embodiments should be understood as being illustrative, not limitative, in all aspects. The scope of the present disclosure is defined based on the attached claims rather than the detailed description, and the claims, equivalents to the claims, and all modifications and alterations derived from the claims and the equivalents should be construed as being included in the scope of the present disclosure.

While the present disclosure has been illustrated and described with reference to the embodiments thereof, it will be apparent to those of ordinary skill in the art that various changes in form and detail may be made thereto without departing from the spirit and scope of the present disclosure.

What is claimed is:

1. A method for providing search information based on color information, the method performed by a search information providing apparatus connected to a plurality of terminals through a communication network, the method comprising:

acquiring a search keyword from the plurality of terminals;

selecting one or more colors, correlated with the acquired keyword, based on a pre-stored keyword-color information correlation;

searching for an object that matches with the selected color; and configuring an interface page information including information about the searched object, collecting an image of the searched object and documents created in correlation with the image;

selecting a representative color information by extracting a color information included in the image; and extracting a first keyword from the documents and calculating a degree of correlation between the representative color information and the first keyword based on frequency of the extracted first keyword;

in configuring an interface page information, the image of the searched object is classified into a plurality of categories according to a purpose of the object in the image, in collecting the image of the searched object and documents, a second keyword appearing together with the collected documents is analyzed for whether the second keyword is an emotional expression through an emotional expression dictionary that lists the emotional expression, and when a distance between the searched object image and the second keyword is less than or equal to a preset value, the second keyword is treated as related to the image, in extracting the first keyword from the documents and calculating the degree of correlation, a degree of correlation between a classified category and an analyzed emotional expression is set by matching the classified category and the analyzed emotional expression.

2. The method of claim 1, further comprising:

storing a degree of correlation of a calculated color information-keyword and the degree of correlation between the classified category and the analyzed emotional expression.

3. The method of claim 1, further comprising:

receiving a detailed view through the interface page information including the information about the searched object, and providing additional information of a search result.

4. The method of claim 3, wherein when the object is an artwork, the additional information includes any one or more of an artist, theme, year of production, type of work, size of work, and location, and when the object is a product, the additional information includes any one or more of detailed information and vendor of the product.

5. The method of claim 1, wherein the second keyword is an emotional expression.

6. An apparatus for providing search information based on color information connected to a plurality of terminals through a communication network, the apparatus comprising:

a storage unit storing a keyword-color correlation configured based on the keyword and color information received through the plurality of terminals, a communication unit configured to transmit data to and receive data from a terminal, the data being for the search information based on color information, a controller configured to acquire a first keyword, to be searched, from the communication unit, select one or more colors correlated with the acquired first keyword based on a pre-stored keyword-color information correlation, search for an object that matches with the selected color, configure an interface page information including information about the searched object, collect an image of the searched object and documents created in correlation with the image, select a representative color information by extracting a color information included in the image, extract the first keyword from the documents and calculate a degree of correlation between the representative color information and the first keyword based on frequency of the extracted first keyword;

the image of the searched object is classified into a plurality of categories according to a purpose of the object in the image, a second keyword appearing together with the collected documents is analyzed for whether the second keyword is an emotional expression through an emotional expression dictionary that lists the emotional expression, and when a distance between the searched object image and the second keyword is less than or equal to a preset value, the second keyword is treated as related to the image, a degree of correlation between a classified category and an analyzed emotional expression is set by matching the classified category and the analyzed emotional expression.

7. The apparatus of claim 6, wherein the controller collects documents created in correlation with an image of the object to be searched, extracts an emotional expression included in the documents by using a pre-stored emotional expression dictionary, extracts color information included in the image to select a representative color information, and calculates the keyword-color correlation based on frequency of the emotional expression.

8. The apparatus of claim 7, wherein the controller selects a representative color about a region of interest of the image.

9. The apparatus of claim 7 or claim 8, wherein the controller identifies a color code mapped to an average pixel value of each unit block constituting the image, and selects a representative color based on a count value of the color code for all unit blocks constituting the image.

10. The apparatus of claim 6, wherein in a case where a category of the object to be searched is limited, the controller filters only a result about the corresponding category, from among a search result, to extract documents that meet a filtering condition.

11. The apparatus of claim 6, wherein when the controller is requested to search for the first keyword when the first keyword has an arbitrary color, the controller provides an interface page information including the correlated first keyword based on the keyword-color correlation.

* * * * *